United States Patent [19]

Clayton

[11] Patent Number: 4,560,129
[45] Date of Patent: Dec. 24, 1985

[54] TILTING APPARATUS FOR A VIEWFINDER OF A CAMERA

[75] Inventor: Richard W. Clayton, Medford, N.J.

[73] Assignee: RCA Corporation, Princeton, N.J.

[21] Appl. No.: 604,975

[22] Filed: Apr. 27, 1984

[51] Int. Cl.[4] ............................................... E04G 3/00
[52] U.S. Cl. ..................................... 248/278; 248/183
[58] Field of Search ............... 248/278, 183, 184, 185; 352/197, 243

[56] References Cited

U.S. PATENT DOCUMENTS

| | | | |
|---|---|---|---|
| 1,006,693 | 10/1911 | Shaw | 248/185 |
| 1,758,240 | 5/1930 | Roach | 248/185 |
| 2,161,909 | 6/1939 | Bornmann | 248/184 |
| 2,326,657 | 8/1943 | Johnston | 248/184 X |
| 2,481,717 | 9/1949 | Blair | 248/183 |
| 3,054,589 | 9/1962 | Godsey | 248/185 |
| 3,545,710 | 12/1970 | Mooney | 248/183 |
| 4,225,105 | 9/1980 | Nakamura | 248/185 |

FOREIGN PATENT DOCUMENTS

| | | | |
|---|---|---|---|
| 1280913 | 7/1972 | United Kingdom | 352/243 |
| 2126823 | 3/1984 | United Kingdom | |

*Primary Examiner*—Ramon S. Britts
*Assistant Examiner*—David M. Purol
*Attorney, Agent, or Firm*—Eugene M. Whitacre; Paul J. Rasmussen; Peter M. Emanuel

[57] ABSTRACT

An apparatus for tilting a viewfinder of a camera in two opposite senses without raising it from a storage position includes a main chassis, a subchassis rotatably mounted within main chassis and a carriage supporting the viewfinder within said subchassis and engaging cam surfaces of the subchassis. The rotation of the subchassis with respect to the main chassis allows for various positions of the viewfinder while tilted in a first sense and movement of the carriage along the cam surfaces of the subchassis allows for various positions of the viewfinder while tilted in a second sense.

14 Claims, 5 Drawing Figures

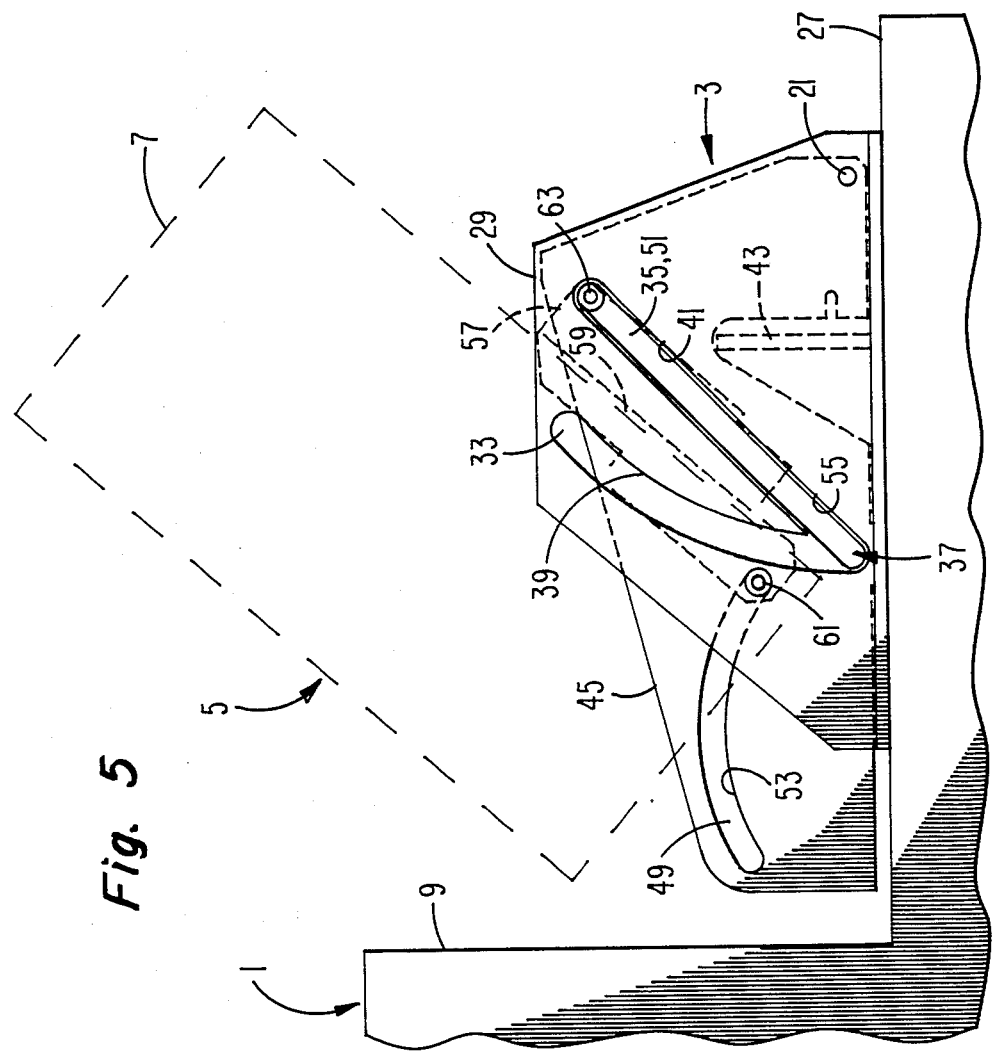

TILTING APPARATUS FOR A VIEWFINDER OF A CAMERA

BACKGROUND OF THE INVENTION

The present invention concerns a mechanism for tiling a viewfinder of a camera in two opposite senses, i.e., upwardly and downwardly.

Cameras used in television studios do not have the capability of allowing the cameraman to view the televised scene directly through the lens. Instead, an electronic viewfinder which includes a small cathode ray tube for displaying the image in response to the electrical signal representing the image produced by the camera for transmission is used. The cathode ray tube may also be used as an oscilloscope during the adjustment of the camera. For both uses, it is often desirable to adjust the position of the viewfinder relative to the housing of the camera for the convenience of the operator. Such position adjustments include tilting the viewfinder upwardly and downwardly as well as rotating it.

In a widely used studio camera, known as the TK-47, manufactured by RCA Corporation, the mechanism for tilting the viewfinder includes an arm rotatably attached at one end to the housing of the camera and a platform which is rotatably attached to the other end of the arm and which supports the viewfinder. The support arm must be rotated from a storage position to a vertical position and then locked before the viewfinder can be tilted in either an upward or downward sense. Raising the viewfinder to its tiltable position is time consuming and inconvenient.

SUMMARY OF THE INVENTION

In accordance with the present invention, an apparatus for tilting a viewfinder of a camera or the like includes a main chassis, a subchassis within the main chassis and rotatably coupled to it and a carriage supporting the viewfinder within the subchassis and moveably engaging cam surfaces of the subchassis. The subchassis (including the carriage and viewfinder within it) is rotatable with respect to the main chassis to tilt the viewfinder in one sense (e.g., upward). The carriage is moveable along the cam surfaces of the subchassis to tilt the viewfinder in the other sense (e.g., downward).

BRIEF DESCRIPTION OF THE DRAWING

FIGS. 3, 4 and 5 are side views of the apparatus shown in FIG. 1 showing it in rest, upward tilt and downward tilt positions, respectively.

In the various FIGURES of the Drawing, the same elements are identified with the same reference numbers.

DETAILED DESCRIPTION OF THE DRAWING

Figure 1:
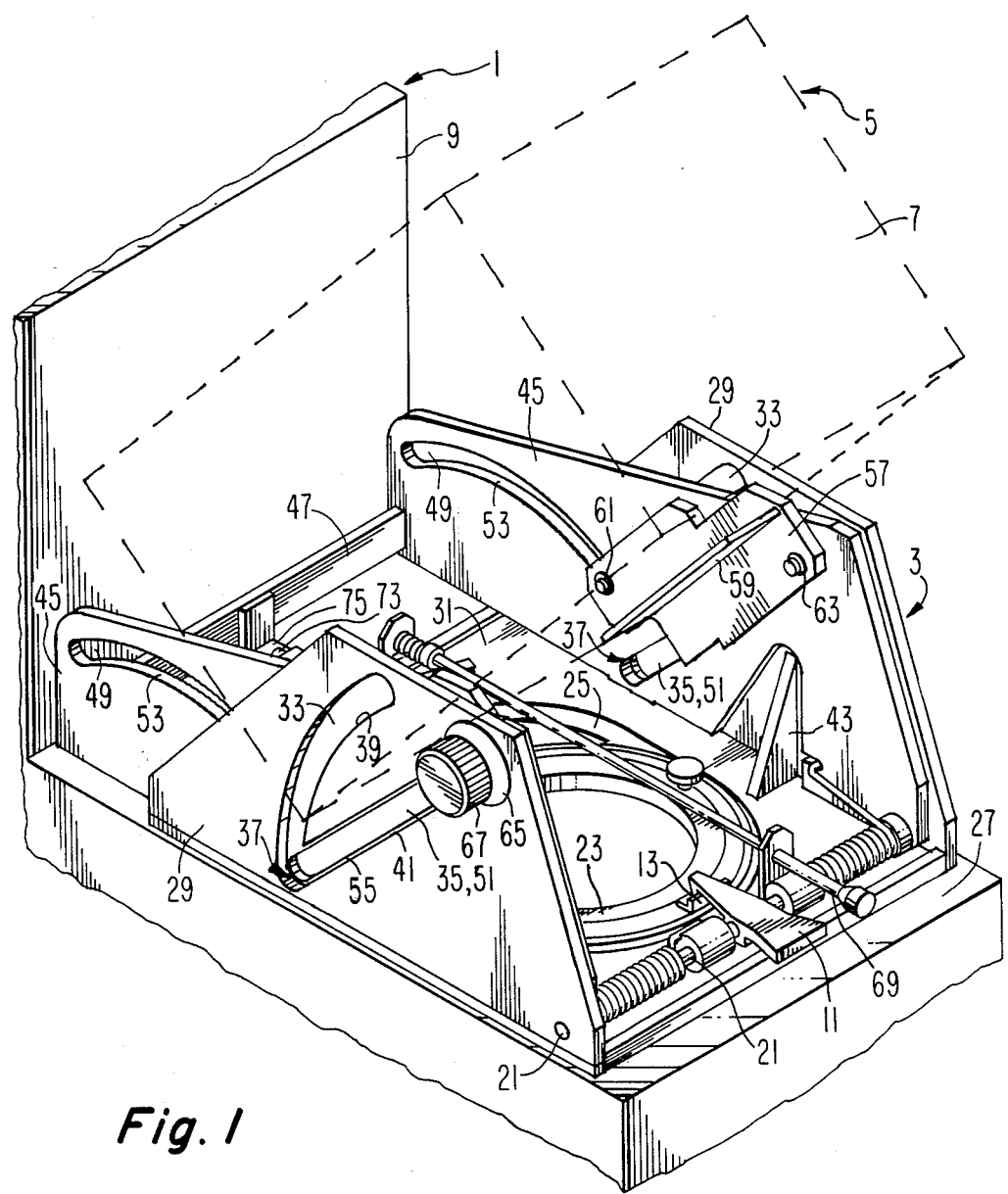
FIGS. 1 and 2 are isometric views showing an apparatus for tilting a viewfinder, constructed in accordance with the present invention, in upward and downward tilt positions, respectively.
Figure 2:
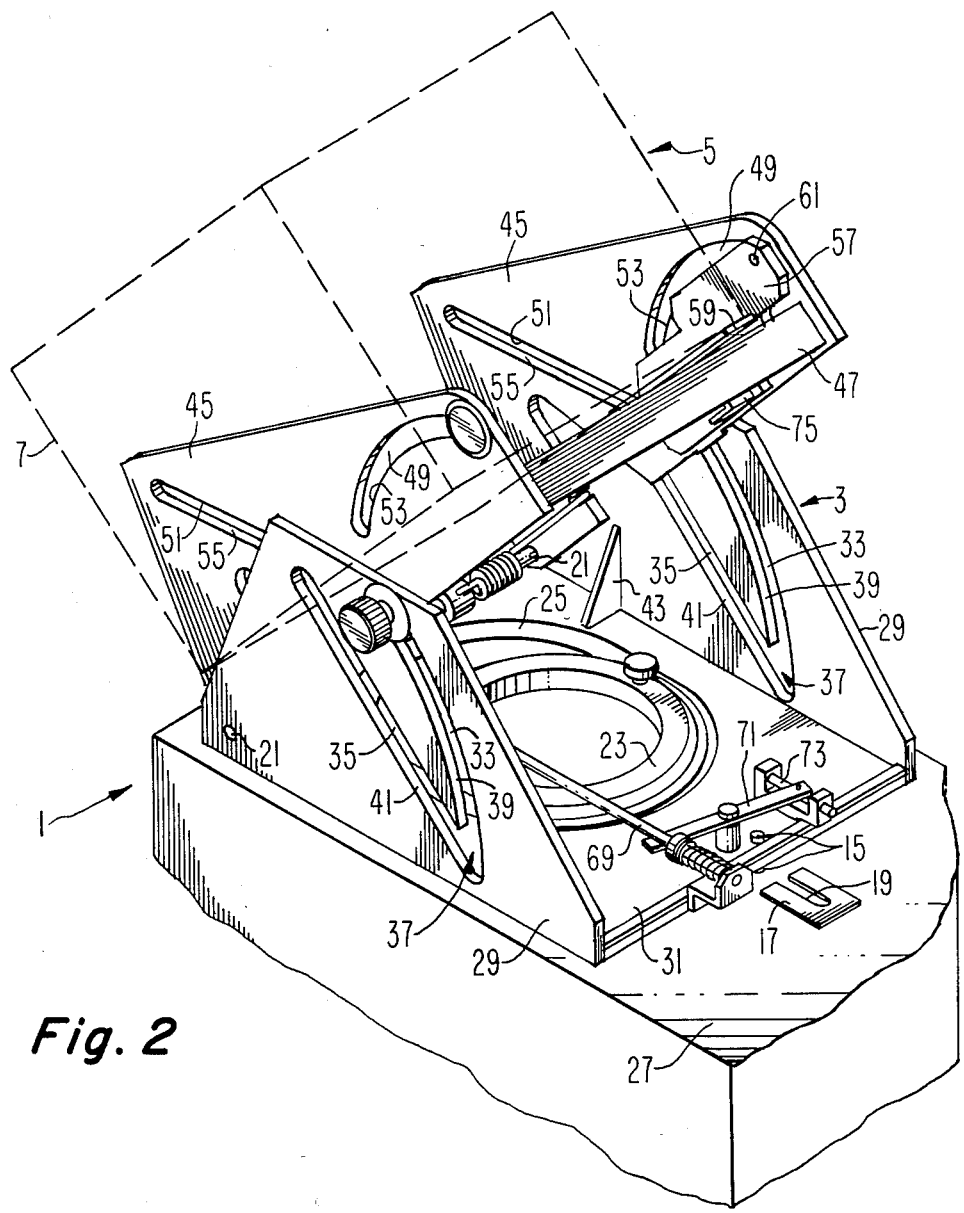

Reference will first be made primarily to FIGS. 1 and 2. However, reference to FIGS. 3, 4 and 5 may also be helpful to more clearly see certain structural elements.

FIG. 1 shows the rear portion of a camera 1 with a mechanism 3 for positioning a viewfinder 5. In the FIGURES, viewfinder 5 is shown in phantom and a cover for viewfinder 5 and positioning mechanism 3 have been omitted for the sake of clarity. Viewfinder 5 has a viewing screen of a CRT (not shown) on a front panel 7. FIG. 1, viewfinder 5 is tilted upward as seen from the rear of camera 1. FIG. 2 shows viewfinder 5 tilted downward as seen from the front of camera 1.

In FIG. 1, viewfinder positioning mechanism 3 is shown in a forward position, i.e., the position in which it is closest to rear camera housing surface 9 of camera 1. When viewfinder 5 is not tilted, it is stored in this position. Mechanism 3 is held in the forward or storage position by the engagement of a latch 11 with a bracket 13. In FIG. 2, mechanism 3 is shown in a rearward position in which it has been pulled rearward away from surface 9. When mechanism 3 is in the forward or storage position, a pin 15 is located within a slot 17 of a member 19, shown in FIG. 2, so that mechanism 3 cannot be rotated.

Latch 11 is mounted on a spring loaded axis 21 and is disengaged from bracket 13 by pressing it. When latch 11 has been disengaged from bracket 13, mechanism 3 can be slid rearwardly. More specifically, a ring 23 extends through and engages an oval track 25 of mechanism 3 and holds it in contact with bottom housing surface 27 of camera 1. When latch 11 is disengaged, oval track 25 can slide rearward under ring 23 to the position shown in FIG. 2. In that position, mechanism 3 can be rotated to position viewfinder 5 sidewardly.

Viewfinder positioning mechanism 3 comprises a rigid metal, e.g., aluminum, main chassis including two substantially parallel sides 29 and a bottom 31, oval track 25 is located in bottom 31. Sides 29 each include a curved slot 33 and a linear slot 35 joined at a common end 37. Inner surfaces of slots 33 and 35 define respective cam surfaces 39 and 41. For rigidity, a respective bracket is connected between each side 29 and bottom 31.

Viewfinder positioning mechanism 3 also comprises a metal subchassis within the main chassis. The subchassis includes two sides 45 which are parallel to sides 29 of the main chassis and which are joined by a bar 47 at one end. At the other end, opposite ends of axis 21 pass through apertures in sides 45 and are connected to sides 29 of the main chassis so that the subchassis is rotatable with respect to the main chassis from the rest position shown in FIG. 1 to the downward tilt position shown in FIG. 2. Because axis 21 is spring loaded, the subchassis is urged away from the main chassis. This bias counterbalances the weight of viewfinder 7. Sides 45 each include a curved slot 49 and a linear slot 51. The inner surfaces of slots 49 and 51 define respective cam surfaces 53 and 55. When the subchassis is in the rest position with respect to the main chassis as shown in FIG. 1, linear slots 51 of the inner subchassis are aligned with linear slots 35 of the outer main chassis.

To provide upward tilt positions, viewfinder positioning mechanism 3 additionally comprises a metal carriage within the subchassis for supporting viewfinder 5. The carriage includes two sides 57 substantially parallel to sides 45 of the subchassis. Sides 57 each include a bracket 59 on which the bottom of viewfinder 5 rests. Each side 57 of carriage includes roller bearings 61 and 63. Each bearing 61 extends through curved slot 49 and moveably engages cam surface 53 of a respective side 45 of the subchassis. Each bearing 63 extends through linear slot 51 and engages cam surface 55 of a respective side 45 of the subchassis and also, depending on the rotational position of the subchassis relative to the main chassis as will be explained below, either extends through linear slot 35 and engages cam surface 41 of the main chassis as shown in FIG. 1 or extends through curved slot 33 and engages cam surface 39 of a respective side 29 of the main chassis as shown in FIG. 2.

A plastic disk 65 is connected to the outer end of each of bearings 63 so as to engage the surface of a respective side 29 of the main chassis to, by friction, maintain the position of the subchassis relative to the main chassis or the carriage relative to the subchassis. The pressure exerted by disk 65 against a respective side 29 of the main chassis can be adjusted by means of a spring loaded knob 67.

While not absolutely necessary for the tilting operation of the positioning mechanism 3, it is desirable to provide a mechanism for holding the subchassis in the rest position relative to the main chassis so as to prevent its rotation while the carriage is being moved to an upward tilt position. The hold down mechanism includes a spring loaded push rod 69, a pivot bar 71 and a rod 73 connected on bottom 31 of the main chassis as shown most clearly in FIG. 2 and a bracket 75 attached to bar 47 of the subchassis. When the subchassis is in the rest position with respect to the main chassis, as shown in FIG. 2, because of the spring bias applied to push rod 69, rod 73 is urged into engagement with bracket 75. When push rod 69 is pushed, rod 73 is disengaged from bracket 75 and the subchassis is thereby made free to rotate with respect to the main chassis.

The tilting operation of positioning mechanism will now be described in greater detail with reference to FIGS. 3, 4 and 5.

Figure 3:
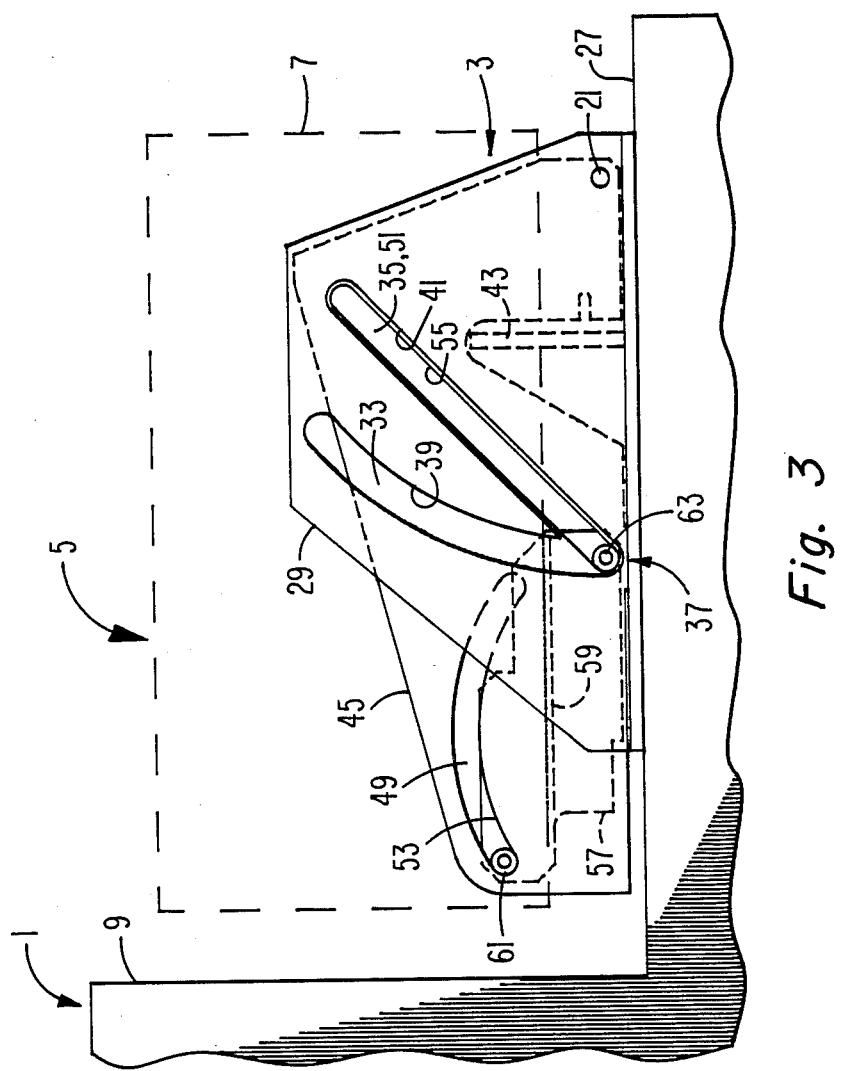

FIG. 3 shows positioning mechanism 3 in its rest position with the subchassis (indicated by side 45) in its rest position with respect to the main chassis (indicated by side 29) and the carriage (indicated by side 57) in its rest position with respect to the subchassis. Note that in the rest position, slot 51 of the subchassis (side 45) is aligned with slot 35 of the main chassis (side 29), bearing 61 is at the extreme end (i.e., that closest to rear surface 9 of the camera housing) of slot 49 of the carriage (side 37) and bearing 63 is at common end 37 of slots 33 and 35 of the main chassis (side 29).

Figure 4:
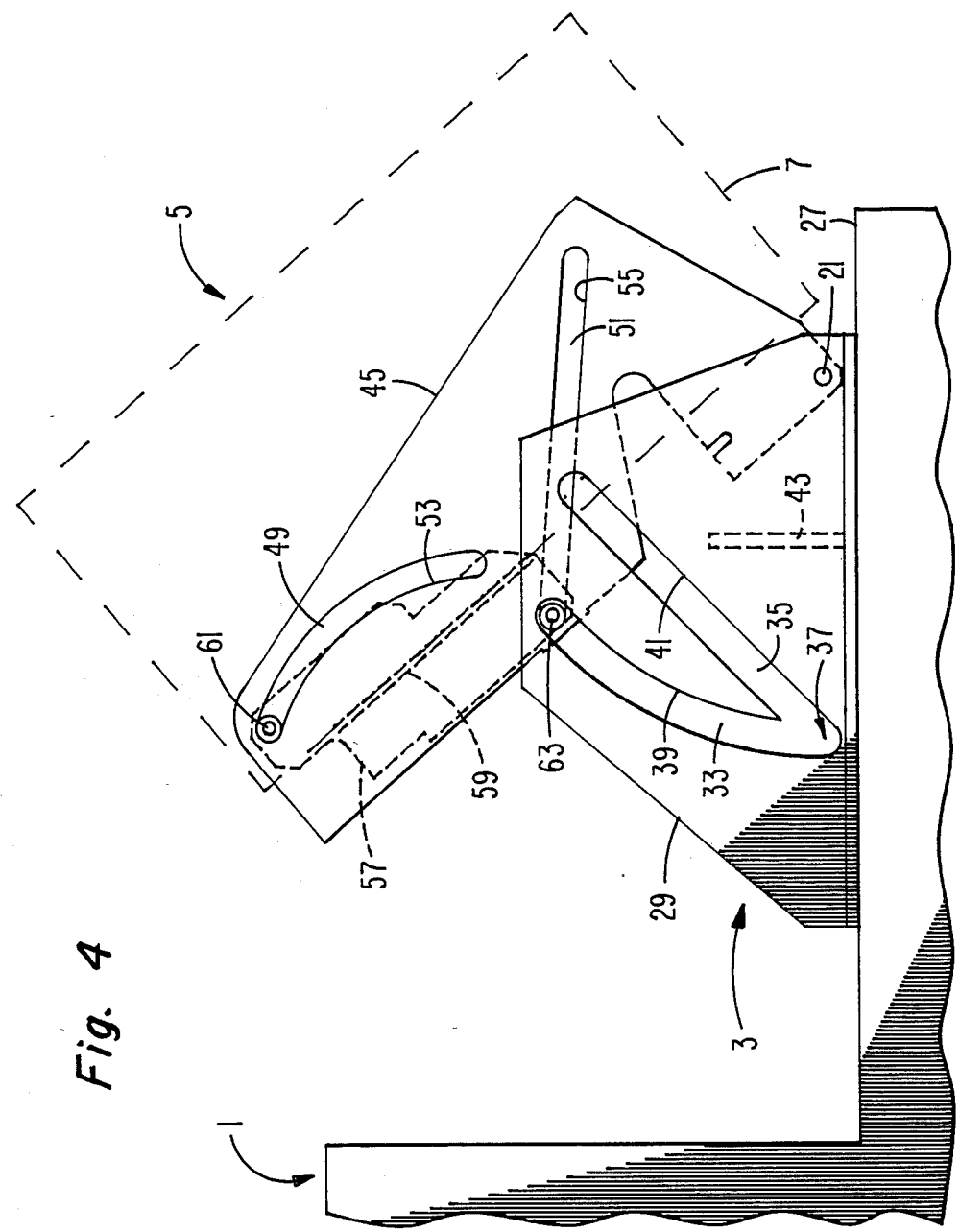

FIG. 4 shows positioning mechanism 3 in its extreme "tilt" down position. To obtain this position, the subchassis (side 45) is rotated with respect to the main chassis (side 29) around axis 21. During the rotation, bearing 61 remains at the extreme end of slot 49 of the carriage (side 57) and bearing 63 rides along cam surface 39 of slot 33 of the main chassis (side 29). Thus, slot 33 of the main chassis (side 29) maintains the carriage (side 57) in its rest position during the rotation of the subchassis (side 45) with respect to the main chassis (side 29) to obtain a tilt down position. Viewfinder 5 can be positioned at any angular position between the rest position and the extreme tilt down position due to friction disk 65 (not shown in FIGS. 3, 4 and 5). The upward rotation of viewfinder 5 is made easier because axis 21 is spring biased to urge the subchassis (side 45) away from the main chassis (side 29) and thereby counter balance the weight of viewfinder 5.

FIG. 5 shows positioning mechanism 3 in its extreme "tilt up" position. To obtain this position, the subchassis (side 45) is maintained in its rest position with respect to the main chassis (side 29) and the carriage (side 57) is moved away from housing surface 9. During this movement, bearings 61 and 63 move along cam surface 53 of slot 49 and cam surface 55 of slot 51, respectively, of the subchassis (side 45). Since bearing 63 must extend through slot 33 of the main chassis (side 29) so that it can engage cam surface 39 during the downward tilting operation as earlier explained, slot 35 of the main chassis (side 29), which is in alignment with slot 51 of the subchassis when the subchassis is in its rest position, is provided to accommodate bearing 63 during the upward tilting operation. While in the embodiment described, slot 35 is substantially identical to 51 and has a cam surface 41 corresponding to cam surface 55 of slot 51 along which a portion of bearing 63 may ride, slot 35 need not be identical to slot 51 and need not have a cam surface 41 corresponding to cam surface 55. That is, slot 51 need only provide for the uninhibited movement of bearing 63 along cam surface 55 of slot 51 of the subchassis (side 29). Friction disk 65 (not shown), will maintain viewfinder 5 in any intermediate position between the rest and extreme positions of the carriage.

It will be noted from the foregoing that both tilt positions can be easilier obtained from the rest position of mechanism 3 without an inconvenient and time consuming intermediate operation such as raising the tilting mechanism as in the prior art described above.

What is claimed is:

1. Apparatus comprising:
a main chassis including a side having a cam surface;
a subchassis inside said main chassis including a side substantially parallel to said side of said main chassis and rotatably coupled thereto, said side of said subchassis having first and second cam surfaces; and
a carriage inside said subchassis including a side substantially parallel to said side of said subchassis, said side of said carriage having first and second bearings engaging respective first and second cam surfaces of said side of said subchassis so as to be moved with respect to said subchassis along said cam surfaces of said subchassis to position said carriage in a first tilt sense;
said subchassis being rotatable with respect to said main chassis to position said carriage in a second tilt sense opposite said first tilt sense;
said second bearing of said carriage also engaging said cam surface of said main chassis so as to be moved along said cam surface of said main chassis when said subchassis is rotated with respect to said main chassis to maintain said carriage in a rest position with respect to said subchassis.

2. The apparatus recited in claim 1, wherein:
said first and second cam surfaces of said subchassis are surfaces of respective first and second slots formed in said side of said subchassis; and
said cam surface of said main chassis is a surface of a slot formed in said side of said main chassis.

3. The apparatus recited in claim 2, wherein:
said first bearing of said carriage extends through said first slot formed in said side of said subchassis;
said main chassis has a second slot which is generally aligned with said second slot of said subchassis when said subchassis is in a rest position with respect to said main chassis; and
said second bearing of said carriage extends through said first slot formed in said side of said subchassis and through said first mentioned slot formed in said side of said main chassis when said subchassis is rotated from its said rest position with respect to said main chassis and through said second slot formed through said side of said main chassis when said carriage is moved from its said rest position with respect to said subchassis.

4. The apparatus recited in claim 3, wherein:
a friction fitting is attached to said second bearing to hold said subchassis in a rotational position with respect to said main chassis and also to hold said carriage in a position with respect to said subchassis.

5. Apparatus comprising:
a viewfinder;
a main chassis including a side having a cam surface attached thereto;
a subchassis rotatably mounted within said main chassis and including a side substantially parallel to said side of said main chassis having first and second cam surfaces attached thereto; and
a carriage supporting said viewfinder within said subchassis and including a side substantially parallel to said side of said subchassis having first and second bearing attached thereto moveably engaging said first and second cam surfaces of said subchassis, respectively, for tilting said viewfinder in a first sense;
said subchassis being rotatable from a rest position with respect to said main chassis to tilt said viewfinder in a second sense opposite to said first sense; said second bearing of said carriage also moveably engaging said cam surface of said main chassis so as to move along it as said subchassis is rotated with respect to said main chassis to prevent said carriage from moving from a rest position with respect to said subchassis.

6. The apparatus recited in claim 5, wherein:
said first bearing of said carriage has a friction fitting for holding said viewfinder in various positions when tilted in either sense.

7. Apparatus comprising:
a viewfinder;
a main chassis having two substantially parallel sides, each of said sides having first and second slots with a common end, each of said first slots having respective first cam surfaces;
a subchassis inside said main chassis and having two sides which are substantially parallel to and rotatably coupled to respective sides of said main chassis at axially aligned pivot points, each of said sides of said subchassis having first and second slots with respective first and second cam surfaces;
said second slot of said main chassis being generally aligned with said second slot of said subchassis when said subchassis is in a rest position with respect to said main chassis; and
a carriage inside said subchassis for supporting said viewfinder, said carriage having first and second sides substantially parallel to said sides of said subchassis, each of said sides of said carriage having first and second bearings;
said first bearing of each of said sides of said carriage extending through said first slot of the respective one of said sides of said subchassis; said second bearing of each of said sides of said carriage extending through said common end of said first and second slots of the respective one of said sides of said main chassis when said subchassis is in said rest position; said second bearing riding along said first cam surface of the respective one of said sides of said main chassis so as to maintain said first bearing of each of said sides of said carriage at a fixed position when said subchassis is rotated about the axis of rotation defined by said pivot points from said rest position to establish a tilt position of said viewfinder in one sense; said first bearing of each of said sides of said carriage riding along said first cam surface of the respective one of said sides of said subchassis and said second bearing of each of said sides of said carriage riding along said second cam surface of the respective side of said subchassis when said carriage is moved with respect to said subchassis and said subchassis is in said rest position to establish a tilt position in a sense opposite to said one sense.

8. Apparatus recited in claim 7, wherein:
said first cam surface each of said sides of said subchassis is angularly directed generally in one direction when each of said second bearings of said carriage is in said common end of said first and second slots of the respective sides of said main chassis; and
said first cam surface of each of said sides of said main chassis and said second cam surface of each of said sides of said subchassis are angularly directed with lesser angles in the order that said cam surfaces are named generally in the direction opposite from said one direction when said first bearing is in said common end of said first and second slots of the respective sides of said main chassis.

9. The apparatus recited in claim 8, wherein:
said first cam surfaces of each of said sides of said main and subchassis are curved; and
said second cam surfaces of each of said sides of said subchassis are substantially linear.

10. The apparatus recited in claim 7, wherein:
a friction fitting is coupled to at least one of said second bearings of said carriage to hold viewfinder in various positions in both of said tilt senses.

11. The apparatus recited in claim 7, wherein:
a spring mechanism is coupled to said subchassis so as to provide a bias against the rotational movement of said subchassis toward said main chassis.

12. The apparatus recited in claim 7, wherein:
a hold down mechanism is provided to selectively hold said subchassis in said rest position with respect to said main chassis.

13. The apparatus recited in claim 7, wherein:
a bottom is connected between said two sides of said main chassis and rests on said camera; and
a rotational mechanism is coupled between said main chassis and said camera for rotating said main chassis about an axis substantially perpendicular to said bottom.

14. The apparatus recited in claim 13, wherein:
a holding mechanism is coupled between said main chassis and said camera for selectively preventing said main chassis from rotating.

* * * * *